No. 764,294. Patented July 5, 1904.

UNITED STATES PATENT OFFICE.

JOHN AUGUSTUS JUST, OF PULASKI, NEW YORK.

DRIED MILK POWDER.

SPECIFICATION forming part of Letters Patent No. 764,294, dated July 5, 1904.

Application filed September 14, 1903. Serial No. 173,358. (Specimens.)

*To all whom it may concern:*

Be it known that I, JOHN AUGUSTUS JUST, a citizen of the United States, residing at Pulaski, in the county of Oswego and State of New York, have invented certain new and useful Improvements in Dried Milk Products; and I do hereby declare the following to be a full, clear, and exact description of the invention, such as will enable others skilled in the art to which it appertains to make and use the same.

My invention relates to the reduction of milk to a dry form by a temperature above 212° Fahrenheit; and it consists in a new product produced from milk by quickly expelling the moisture at a comparatively high temperature. After the water has been so expelled the solid ingredients of the milk remain chemically and physically unchanged in the form of a fluffy, flaky, loose, and porous powder, which dissolves readily in water, reproducing a true milk. This powder is distinguished by the following characteristics: It is porous, fluffy, and flaky, as aforesaid, and is therefore readily soluble. It contains all the solid ingredients of the milk unchanged physically and chemically, so that when the proper amount of water is again added a true milk is reproduced answering to all the milk tests. It is very light in weight, increasing slightly in weight in proportion to the amount of fat in the milk. It is of a white slightly-yellowish color, the yellow tinge slightly increasing with the amount of fat or cream in the milk. It is sterilized, non-hygroscopic, and practically dry, containing but a small percentage of water, not substantially over seven per cent., including the water of crystallization in the milk-sugar, so that it is permanent, capable of resisting all climatic changes, and may be preserved indefinitely, without sensible deterioration, in ordinary packages in any climate. It has the pure sweet-milk odor, and either dry or mixed with a small amount of water, has the pure sweetish saline taste of highly-concentrated milk. When mixed with the correct proportion of about seven parts water, it has the sweet-milk taste and odor.

The prior dry forms of milk with which I am acquainted are the so-called "milk powders" produced by reducing the milk slowly in comparatively a low temperature of about 130° Fahrenheit and commonly in a partial vacuum.

My product is produced by an essentially different process or processes and can be distinguished readily and positively therefrom by the characteristics hereinbefore described. These low-temperature and vacuum-produced powders are comparatively heavy, dense, and of a pulverulent or granular and gritty texture, so that they are not easily soluble, but pack closely when water is added. They are not sterile. They have a decided odor, like caramel, and usually on standing develop a disagreeable cheesy odor, indicating that a change in the milk solids has taken place. Such powders compared to my product are heavy and contain a large amount of moisture. For instance, the comparative weight, bulk for bulk, of my product and others is as follows, the amount weighed of each being ten cubic centimeters: my product from skim-milk, 3.2130 grams; my product from full milk, 4.8274 grams; C. V. powder, 6.4840 grams; C. N. powder, 7.6510. These old powders are therefore somewhat lighter than water, while my product is very much lighter, a marked characteristic quality.

In a comparative moisture test the results obtained by exposing the different products to a temperature of 212° Fahrenheit for seven hours my skim-milk product lost 1.09 per cent. moisture; my full-milk product lost 1.35 per cent. moisture; C. V. powder lost 5.35 per cent. moisture; C. N. powder lost 4.89 per cent. moisture.

"C. V." and "C. N." are the common trade names of "Cherry Valley Drimilk" and "Campbell's Nutrium," two of the best known low-temperature vacuum products.

In my product the milk solids are unchanged chemically and physically. In particular the milk-sugar is maintained unchanged, avoiding the development of a bitter or burned taste and a change in color. The salts of milk are maintained in equilibrium, and the dicalcic caseinate (casein) is preserved with its normal swelling-up quality unchanged. There are no foreign substances present in my product; but in the process I prefer to cut off the excessive acidity of the milk to about neutral by the addition of lime or a soluble lime salt or any suitable alkali or alkaline salt to prevent the effect of the lactic acid—viz., to precipitate the casein, rendering it insoluble when the acid becomes sufficiently concentrated during evaporation. Such reagent or reagents are used in an amount not to be noticeable and leave an ingredient natural to the salts of milk.

My product may be produced by the process of my Letters Patent No. 712,545, issued November 4, 1902, and from milk containing a greater or less proportion of cream, such as full milk or skim-milk or milk with a portion of the cream removed or with a surplus of cream, the color and weight varying slightly with the amount of cream, as aforesaid. For instance, I have produced my new product containing fat in as high a proportion as forty per cent. of the solids advantageously and without diminishing its preservability.

Having thus described my invention, what I claim, and desire to secure by Letters Patent, is—

1. The herein-described product being a practically dry, porous, fluffy, flaky powder, consisting of the solid ingredients of milk.

2. The herein-described product, being a porous, fluffy, flaky powder, consisting of all the solid ingredients of milk chemically and physically unchanged and not substantially more than seven per cent. of water.

3. The herein-described product, being a porous, fluffy, flaky powder, germ-free, easily soluble in water and consisting of all the solid ingredients of milk.

4. The herein-described milk product, being a practically dry, porous, fluffy, flaky powder, consisting of all the solid ingredients of milk and much lighter than water.

5. The herein-described milk product, being a practically dry, porous, fluffy, flaky powder, germ-free, consisting of all the solid ingredients of milk chemically and physically unchanged, much lighter in weight than water and easily soluble in water.

6. The herein-described milk product, being a creamy white, porous, fluffy, flaky powder, consisting of the solid ingredients of milk, having the sweetish saline taste of highly-concentrated pure milk, and easily soluble in water to produce a sweet, uniform milk.

7. The herein-described milk product, being a practically dry, porous, fluffy, flaky powder, consisting of all the solid ingredients of milk, and of a weight not materially greater than one-half the weight of water.

In testimony whereof I affix my signature in presence of two witnesses.

JOHN AUGUSTUS JUST.

Witnesses:
   C. C. SCHOENECK,
   M. E. GAGON.